US008945741B2

(12) United States Patent
Minami et al.

(10) Patent No.: US 8,945,741 B2
(45) Date of Patent: Feb. 3, 2015

(54) BATTERY PACK INCLUDING A GUIDE DISPOSED ON AN INNER SURFACE OF A CASE

(75) Inventors: Hiromasa Minami, Hamamatsu (JP); Jun Mishima, Hamamatsu (JP); Shin-ichi Hoshino, Hamamatsu (JP); Minoru Watanabe, Ritto (JP); Toshiki Kusunoki, Ritto (JP); Shingo Kawahara, Ritto (JP)

(73) Assignees: Lithium Energy Japan, Kyoto-Shi, Kyoto (JP); Suzuki Motor Corporation, Hamamatsu-Shi, Shizuoka (JP)

( * ) Notice: Subject to any disclaimer, the term of this patent is extended or adjusted under 35 U.S.C. 154(b) by 259 days.

(21) Appl. No.: 13/489,364

(22) Filed: Jun. 5, 2012

(65) Prior Publication Data

US 2012/0315520 A1   Dec. 13, 2012

(30) Foreign Application Priority Data

Jun. 8, 2011  (JP) ................................ 2011-128444
May 29, 2012  (JP) ................................ 2012-121604

(51) Int. Cl.
*H01M 2/12* (2006.01)
*H01M 2/10* (2006.01)
*H01M 10/613* (2014.01)
*H01M 10/625* (2014.01)
*H01M 10/647* (2014.01)
(Continued)

(52) U.S. Cl.
CPC ........ *H01M 2/1077* (2013.01); *H01M 10/5004* (2013.01); *H01M 10/5016* (2013.01); *H01M 10/5032* (2013.01); *H01M 10/5057* (2013.01); *H01M 10/5059* (2013.01); *H01M 10/5067* (2013.01)

USPC ............................................ 429/82; 429/176

(58) Field of Classification Search
USPC ........ 429/83, 82, 148, 62, 120, 176; 165/121; 307/150
See application file for complete search history.

(56) References Cited

U.S. PATENT DOCUMENTS 5,585,204 A * 12/1996 Oshida et al. .................... 429/62
6,498,406 B1 * 12/2002 Horiuchi et al. .............. 307/150
(Continued)

FOREIGN PATENT DOCUMENTS

JP   2006-216505 A   8/2006
JP   2007-227030 A   9/2007
(Continued)

OTHER PUBLICATIONS

European Search Report dated Oct. 2, 2013.

*Primary Examiner* — Kenneth Douyette
(74) *Attorney, Agent, or Firm* — McGinn IP Law Group, PLLC

(57) ABSTRACT

A cover 1*b* of a battery pack case has an intake port and an exhaust port 31. With in the battery pack case, battery accommodation sections respectively accommodate battery modules and a junction box accommodation section. A supply flow path and an exhaust flow path are provided at ends of each of the battery accommodation section. A guide is provided between the cover and the battery modules accommodated in the battery accommodation portions. The guide and a lower surface of the cover define a distribution flow path. The air introduced from the intake port flows to the exhaust port through the distribution flow path, supply flow paths, clearances between battery cells, exhaust flow paths, and exhaust port. The battery cells are efficiently cooled.

16 Claims, 7 Drawing Sheets

(51) Int. Cl.
*H01M 10/6556* (2014.01)
*H01M 10/6557* (2014.01)
*H01M 10/6563* (2014.01)

(56) References Cited

U.S. PATENT DOCUMENTS

| | | | |
|---|---|---|---|
| 2005/0153199 A1* | 7/2005 | Yagi et al. | 429/148 |
| 2008/0121380 A1* | 5/2008 | Shimoyama | 165/121 |
| 2008/0314657 A1 | 12/2008 | Ikeda et al. | |
| 2009/0191452 A1* | 7/2009 | Anantharaman et al. | 429/120 |
| 2011/0177367 A1* | 7/2011 | Chung et al. | 429/83 |

FOREIGN PATENT DOCUMENTS

| | | | |
|---|---|---|---|
| JP | 2008-097830 A | 4/2008 | |
| JP | 2009-4319 A | 1/2009 | |
| JP | 2009-004323 A | 1/2009 | |
| JP | 2009-087758 A | 4/2009 | |
| WO | WO-2010/013902 A1 * | 2/2010 | H01M 2/08 |

* cited by examiner

BATTERY PACK INCLUDING A GUIDE DISPOSED ON AN INNER SURFACE OF A CASE

This application claims priority from Japanese Patent Applications Nos. 2011-128444 and 2012-121604, the disclosures of which are incorporated herein by reference in their entireties.

BACKGROUND OF THE INVENTION

The present invention relates to a battery pack.

BACKGROUND ART

A battery pack used for various applications including power sources for electric car has a plurality of battery modules accommodated in a pack case. Each of the battery modules has a plurality of electrically connected battery cells.

A battery pack disclosed in JP-A-2008-97830 has a flow regulation plate disposed in a flow path of cooling air to be supplied to battery cells. The flow regulation plate is intended to guide the cooling air so as to uniformly cool the battery cells.

Battery modules in a battery pack disclosed in JP-A-2007-227030 are arranged in a tilted attitude within a pack case. This arrangement forms a refrigerant path gradually narrowed from upstream to downstream sides. The narrowed refrigerant path is also intended to uniformly cool the battery cells.

A battery pack disclosed in JP-A-2009-4323 has an electrical junction box disposed between a group of battery modules and other group of the battery modules. A battery pack disclosed in JP-A-2009-87758 includes a cooling air inlet and a cooling air outlet diagonally disposed in a planar view.

SUMMARY OF THE INVENTION

However, even through the flow regulation plate is disposed as disclosed in JP-A-2008-97830, it is not possible to avoid the tendency where a large amount of cooling air is supplied to the battery cells positioned downstream of a flow of the cooling air, therefore uniform cooling of the plurality of battery cells being difficult to be achieved.

The battery modules arranged in the tilted attitude within the pack case as disclosed in JP-A-2007-227030 results in upsizing of the battery pack. In addition, the arrangement disclosed in JP-A-2007-227030 requires an exhaust duct within the pack case, which causes increasing of parts count and costs.

The layout of the battery modules and the electric connection box disclosed in JP-A-2009-4323 is intended to reduce the size and weight of the battery pack by decreasing the number of the members for electrical connection, but does not relate to cooling of the battery cells. JP-A-2009-87758 does not provide any particular teaching on cooling of the battery cells, except for the positions of the cooling air inlet and outlet.

It is an object of the present invention to achieve efficient cooling of battery cells included in a battery pack.

The present invention provides battery pack comprising: a case having an intake port for introducing air into an interior space thereof and an exhaust port for exhausting air from the interior space; a plurality of battery accommodation sections arranged along a first direction within the interior space of the case and respectively accommodating a plurality of battery cells with clearances therebetween; a supply flow path provided one end of a second direction of the battery accommodation sections, the second direction intersecting with the first direction; an exhaust flow path provided at the other end of the second direction of the battery accommodation sections and communicated with the exhaust port; a guide disposed on an inner surface of the case and elongated along the first direction; and a distribution flow path defined by the guide and the inner surface of the case, elongated along the first direction, and communicated with the intake port and the supply flow path.

A Cooling air introduced from the intake port into the interior space of the case flows through the distribution flow path and then enters into the supply flow path of each of the battery accommodation sections. The air entering into the supply flow path then flows into the exhaust flow path through the clearances between the battery cells accommodated in the battery accommodation sections, and then is exhausted from the exhaust port. Supplied to each of the battery accommodation sections is not the air already passed through the clearances between the battery cells accommodated in other battery accommodation section, but the air taken from the air intake port through the distribution flow path and the supply flow path. The flow of the air unifies the efficiency of cooling the battery cells among the battery accommodation sections, thereby improving the efficiency of cooling the battery cells in the entire battery pack.

Due to distribution flow path defined by the guide disposed on the inner surface of the case and the inner surface of the case, a desired flow of air can be obtained without the need for upsizing of the battery pack. The distribution flow path defined using the inner surface of the case can suppress increase in a parts count and parts-related cost.

The guide is provided so that a section area of the distribution flow path gradually decreases with increasing distance from the intake port.

With regard to a pressure difference, the distribution flow path demonstrates a tendency to allow air flow more easily with increasing distance from the intake port. By the gradually decreased section area of the distribution flow path with increasing distance from the intake port, the distribution flow path demonstrates a tendency where the air flows less easily with increasing distance from the intake port. The tendency of the air flowability due to a pressure difference is canceled by the tendency of the air flowability due to the change in section area of the distribution flow path, whereby a unified amount of air flows from the distribution flow path into the supply flow path of each of the battery accommodation sections. As a result, the efficiency of cooling the battery cells among the battery accommodation sections can further be unified, thereby further improving the efficiency of cooling the battery cells in the entire battery pack.

The guide includes a main guide section positioned with a space to the inner surface of the case and elongated along the first direction; and a first sub-guide section extending from one side portion of the main guide section to the inner surface of the case. An air distribution port is defined between the other side portion of the main guide section and the inner surface of the case so that the air distribution portion is elongated along the first direction and communicates the distribution flow path with the supply flow path.

The guide further includes a second sub-guide section guiding the air introduced from the intake port to the supply flow path of the specific one of the battery accommodation sections The case may include a case main body with an opening at an upper portion thereof and a cover attached to the case main body so as to close the opening. The main guide section is positioned with a space to an inner surface of the cover and together with the inner surface of the cover defines the distribution flow path positioned above the battery cells. The first and second sub-guide sections extend from the main guide section toward the inner surface of the cover.

According to the foregoing arrangement, the guide for forming the distribution flow path is disposed between the battery module and the cover, which makes it possible to obtain a desired flow of air without influence of layout of the battery module and the like within the case.

The first and second guide sections are made of an elastic material and urged to the inner surface of the cover attached to the case main body.

The foregoing arrangement can form a desired distribution flow path without the need for higher accuracy of processing the first and second guide sections, thereby further achieving cost reduction.

At least a portion opposed to the intake port of the main guide section is made of gas-impermeable material According to the foregoing arrangement, even if gas were accidentally leaked out of a battery cell accommodated in the case, the leaked gas does not leak from the intake port toward the outside of the case through the main guide section.

The air is introduced from the intake port to the supply flow path of each of the battery accommodation sections, via the distribution flow path defined by the guide disposed on the inner surface of the case and the inner surface of the case. Due to the arrangement, the efficiency of cooling the battery cells among the battery sections can be unified without the need for upsizing of the battery pack, thereby improving the efficiency of cooling the battery cells in the entire battery pack.

DETAILED DESCRIPTION OF THE INVENTION

Figure 1:
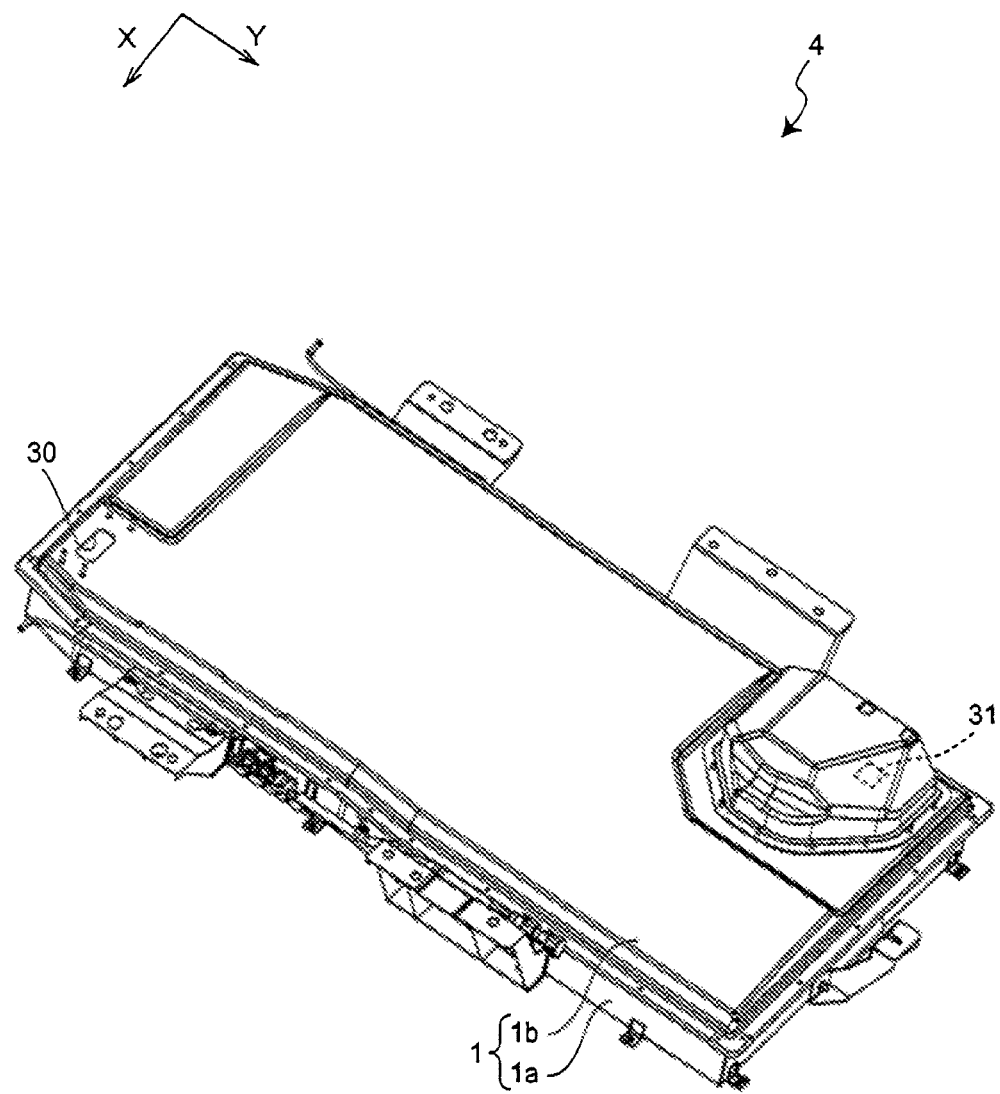
FIG. 1 is a perpendicular view of a battery pack according to an embodiment of the present invention.

An embodiment of the present invention will be described below with reference to the accompanying drawings. In the following description, the terms indicative of specific directions and positions (for example, the terms including the words "upper," "lower," "side," and "end") are used as necessary. These terms are used for facilitating understanding of the present invention with reference to the drawings, but the meanings of the terms do not limit the technical scope of the present invention. In addition, the following description is virtually mere citation of examples, but is not intended to limit the present invention, articles to which the present invention is applied, or applications of the present invention.

FIGS. 1 to 4 show a battery pack 4 for a vehicle according to the present embodiment. The battery pack 4 includes a battery pack case 1 having a substantially box-shaped case main body 1a with an opening at an upper portion thereof and a substantially plate-shaped cover 1b attached to the case main body 1a so as to close the opening.

The cover 1 is provided with an intake port 30 for introducing a cooling air into an interior space of the battery pack case 1 and an exhaust port 31 for exhausting the air from the interior space of the battery pack case 1. The intake port 30 is connected to a cooling air source such as an in-vehicle air-conditioning system for electric car. The intake port 30 is disposed near a corner of one end of a longitudinal direction or a Y direction (first direction) of the battery pack case 1 and the air exhaust port 31 is disposed near a corner of the other end of the longitudinal direction of the battery pack case 1.

Figure 2:
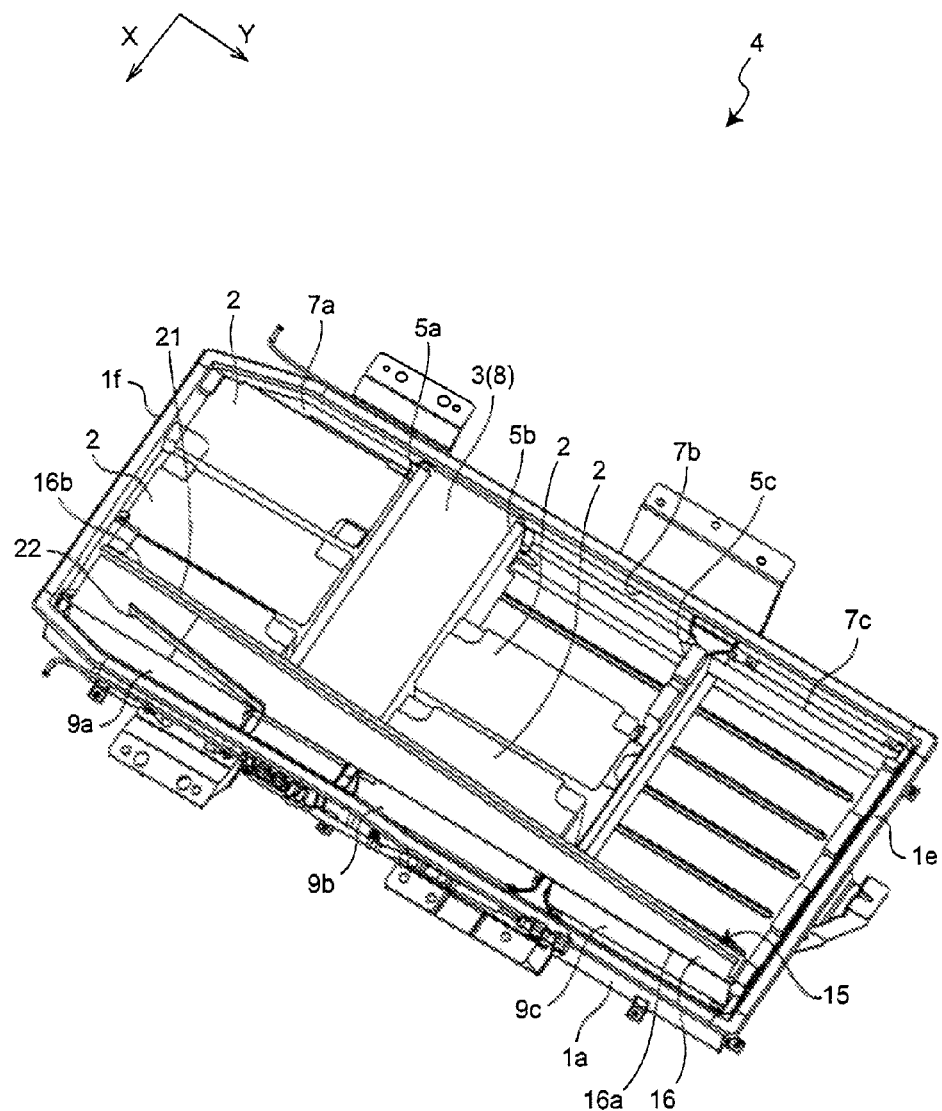
FIG. 2 is a perpendicular view of the battery pack according to the embodiment of the present invention (with a cover removed)
Figure 4:
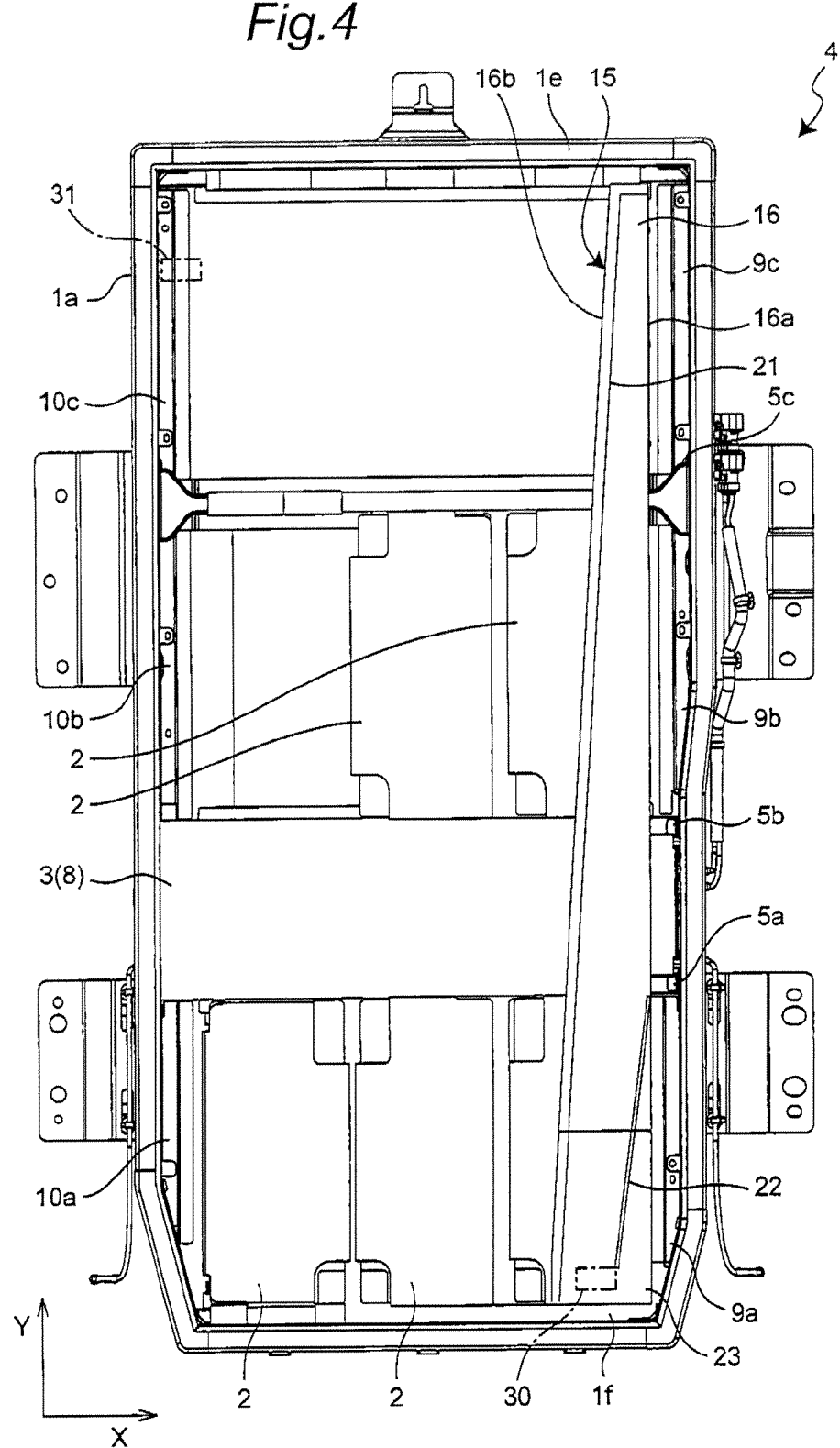
FIG. 4 is a plane view of FIG. 3 (with a guide also removed)

As shown in FIGS. 2 and 4, the battery pack case 1 accommodates in the interior space a plurality of (nine in the present embodiment) battery modules 2 and a junction box 3. (FIGS. 2 and 4 do not show some of the battery modules 2).

Figure 3:
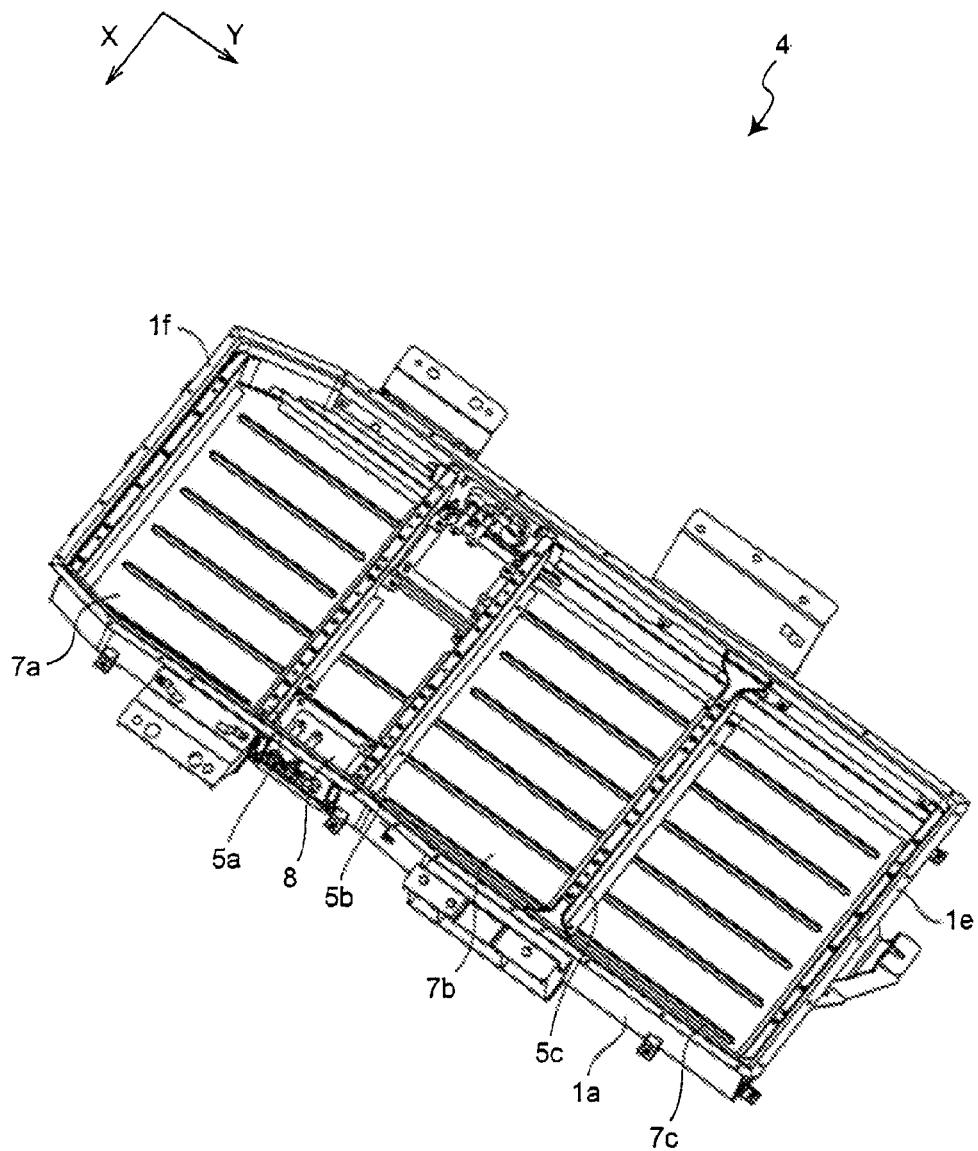
FIG. 3 is a perpendicular view of the battery pack according to the embodiment of the present invention (with the cover, a battery module, and a junction box removed)

As most clearly shown in FIG. 3, the interior space of the battery pack case 1 is divided into four longitudinally-aligned spaces by three partition walls 5a, 5b, and 5c disposed with spaces therebetween in the longitudinal direction or the Y direction (first direction) of the battery pack case 1. Specifically, a first battery accommodation section 7a, a junction box accommodation section (JB accommodation section) 8, a second battery accommodation section 7b, and a third battery accommodation section 7c, are disposed in this order from the intake port 30 (see FIG. 1) side in the longitudinal direction of the battery pack case 1. The first to third battery accommodation sections 7a to 7c respectively accommodate a plurality of (three in the present embodiment) battery modules 2. The JB accommodation section 8 accommodate the junction box 3.

Figure 7:
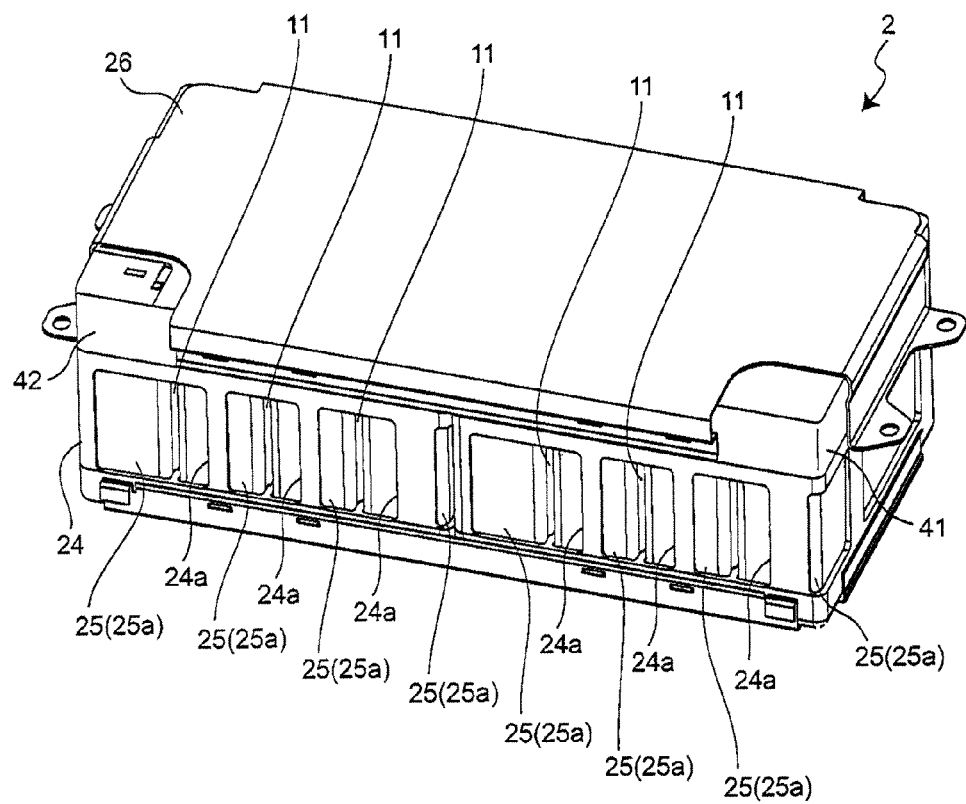
FIG. 7 is a perpendicular view of the battery module.

Further referring to FIG. 7, the battery modules 2 respectively include a battery module case 24 in which a plurality of (nine in the present embodiment) battery cells 25 are aligned in a line and a battery module cover 26 covering an upper portion of the battery module case 24. The adjacent battery cells 25 are opposed at longer sides to each other in a planar view with a clearance 11 therebetween. The battery module case 24 has openings 24a fluidly communicated with the clearance 11 on both side walls constituting the longer sides thereof in a planar view.

The battery cells 25 in the present embodiment are non-aqueous electrolyte secondary batteries such as lithium ion batteries, each of which includes a substantially flat cubic-shaped battery container 25a. The battery container 25a stores a power generating element (not shown) and contains an electrolytic solution in a sealed manner. The battery container 25a has on upper both sides thereof positive and negative electrodes (not shown) electrically connected to the power generating container. These electrodes are coupled with a bus bar (not shown) to establish electric connection between the electric cells 25.

Each of the battery modules 2 includes positive and negative electrodes on both ends of a side edge (in FIG. 7, these electrodes are covered with protection covers 41 and 42). These electrodes are coupled with a bus bar (not shown) to establish electric connection between the battery modules 2.

A structure for guiding cooling air from the intake port 30 to the exhaust port 31 will be described below mainly with reference to FIGS. 5 to 6C.

Each of the battery accommodation sections 7a to 7c has three battery modules 2 aligned in a line in a width direction or an X direction (second direction) of the battery pack case 1. The battery modules 2 are positioned in a planar view so as to be aligned in the longitudinal direction (Y direction) of the battery pack case 1. Therefore, the clearances 11 between the two adjacent battery cells 25 of each battery module 2 extend in the width direction (X direction) of the battery pack case 1.

Figure 5:
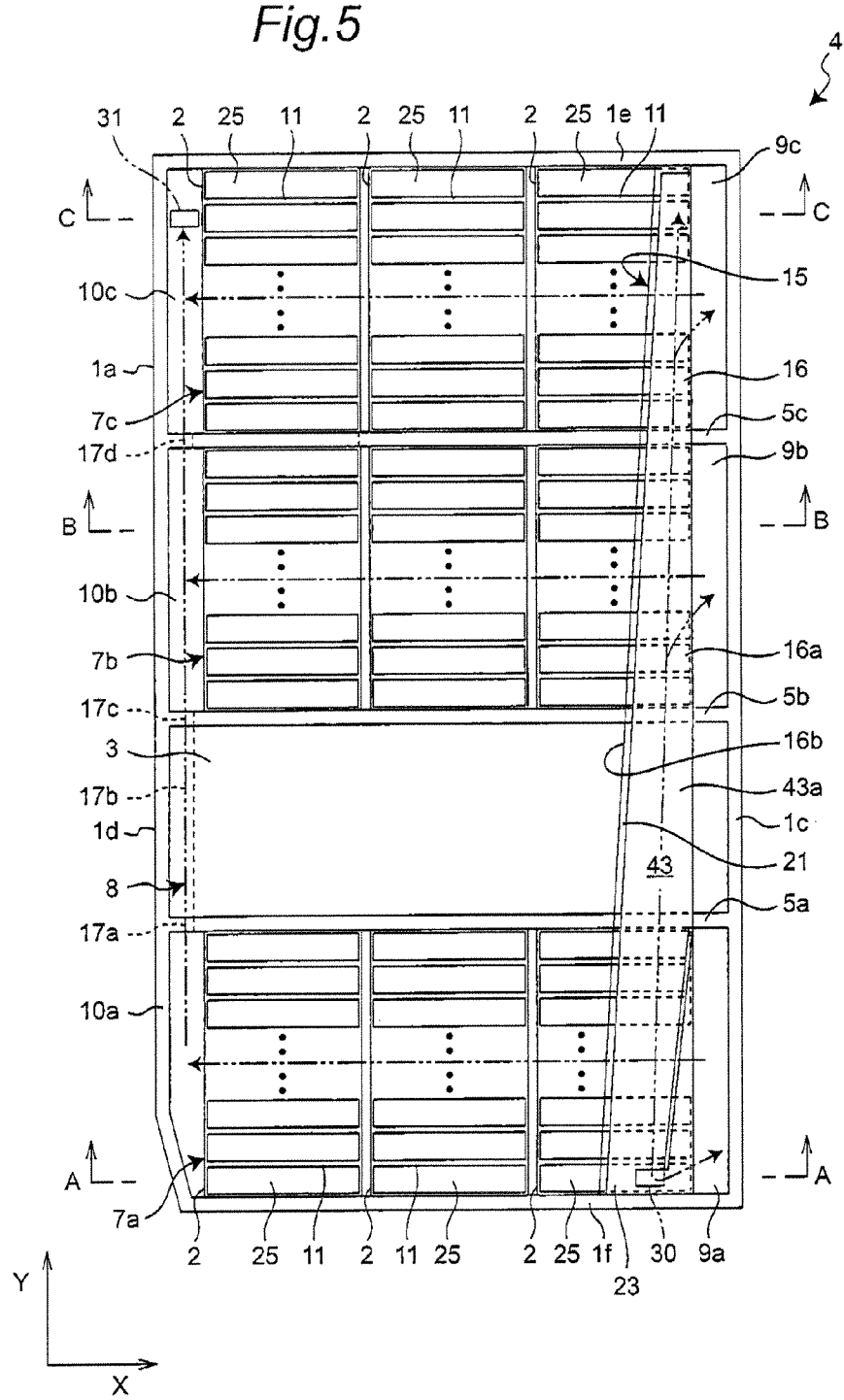
FIG. 5 is a schematic plane view of the battery pack according to the embodiment of the present invention (with the cover removed)
Figure 6A:
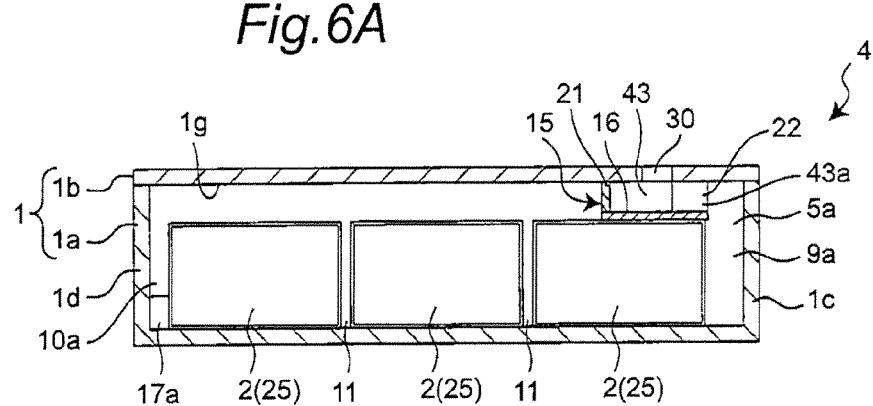
FIG. 6A is a cross section view of FIG. 5 taken along a line A-A.
Figure 6B:
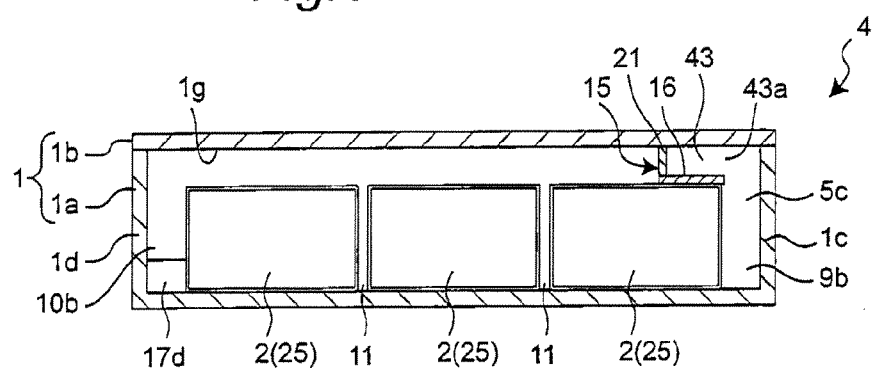
FIG. 6B is a cross section view of FIG. 5 taken along a line B-B.
Figure 6C:
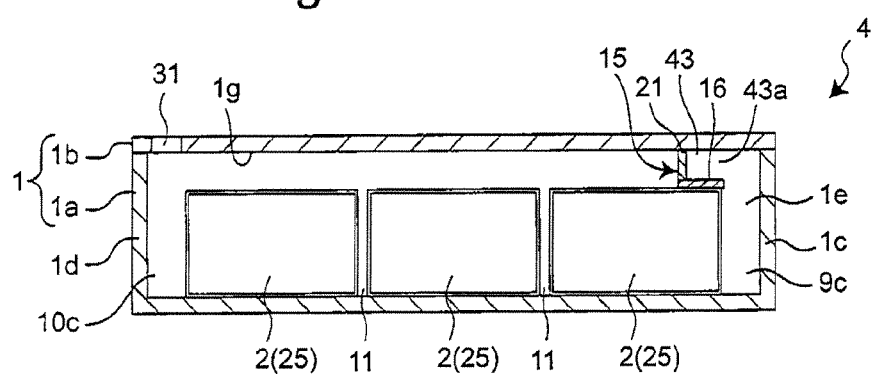
FIG. 6C is a cross section view of FIG. 5 taken along a line C-C.

In FIGS. 5 to 6C, the battery accommodation sections 7a to 7c have the battery modules 2 positioned at the rightmost side that are opposed with spaces to one side wall 1c of the case main body 1a of the battery pack case 1. The spaces provide supply flow paths 9a, 9b, and 9c respectively disposed at one end (right end in FIGS. 5 to 6C) in the width direction (X direction) of each of the battery accommodation sections 7a to 7c. The supply flow paths 9a, 9b, and 9c are elongated along the longitudinal direction (Y direction) of the battery pack case 1. Air from the intake port 30 flows into the supply flow paths 9a to 9c via a distribution flow path 43 described later.

In FIGS. 5 to 6C, the battery accommodation sections 7a to 7c have the battery modules 2 positioned at the leftmost side that are opposed with spaces to the other side wall 1d of the case main body 1a of the battery pack case 1. The spaces provide exhaust flow paths 10a, 10b, and 10c respectively disposed at the other end (left end in FIGS. 5 to 6C) in the width direction (X direction) of each of the battery accommodation sections 7a to 7c. The exhaust flow paths 10a, 10b, and 10c are elongated along the longitudinal direction (Y direction) of the battery pack case 1. The exhaust flow path 10a is directly fluidly communicated with the exhaust port 31. Further, notch portions 17a, 17b, 17c, and 17d for passage of air are provided on lower parts of the partition walls 5a to 5c and the junction box 3. The notch portions 17a to 17d establish fluid communication from the exhaust paths 10b and 10c to the exhaust port 31 via the exhaust path 10c.

The battery pack case 1 has in the interior space a long and narrow shaped guide 15 generally elongated along the longitudinal direction (Y direction) of the battery pack case 1 so as to be extended across a range between a pair of end walls 1e and 1f opposed to each other in the longitudinal direction (Y direction) of the case main body 1a. The guide 15 is positioned between the battery modules 2 at the rightmost side shown in FIGS. 5 and 6A to 6C in the width direction (X direction) of the battery pack case 1 among the battery modules 2 stored in the battery accommodation sections 7a to 7c and the cover 1b. Further, the guide 15 is positioned adjacent to the supply flow paths 9a to 9c in the width direction (X direction) of the battery pack case 1.

The guide 15 is positioned with a space to a lower surface 1g of the cover 1b and includes a long and narrow shaped plate-like main guide section 16 being elongated along the longitudinal direction (Y direction) of the battery pack case 1. The main guide section 16 has an upper surface parallel to the lower surface 1g of the cover 1b. The distance between the upper surface of the main guide section 16 and the cover 1b is set to constant. One end of the main guide section 16 is opposed to the intake port 30 provided in the cover 1b (see FIGS. 5 and 6A).

In the present embodiment, the main guide section 16 is fixed to the three battery modules 2 at the rightmost side in FIGS. 5 and 6A to 6C. There are no clearances between the upper surfaces of the battery modules 2 and the main guide section 16.

The main guide section 16 includes a pair of side edges 16a and 16b opposed to each other in the width direction (X direction) of the battery pack case 1. The side edge 16a close to the side wall 1c is formed in a straight line extending in parallel to the side wall 1c of the battery pack case 1. The side edge 16b distant from the side wall 1c is slanted so as to approach to the side edge 1a with increasing distance from the intake port 30 in a planar view. In other words, the main guide section 16 is smaller in width (dimension in the X direction) with increasing distance from the intake port 30.

The guide 15 includes a long and narrow shaped rib-like first sub-guide section 21 provided along the side edge 16b on the upper surface of the main guide section 16. The first sub-guide section 21 has a lower end connected to the upper surface of the main guide section 16 and an upper end being urged to or in closely contacted with the lower surface 1g of the cover 1b. There is no member at the side edge 16a side of the main guide section 16.

As most clearly shown in FIGS. 6A to 6C, the long and narrow distribution flow path 43 is defined by the guide 15 and the lower surface 1g of the cover 1b so as to communicate at one end with the intake port 30 and so as to be elongated along the longitudinal direction (Y direction) of the battery pack case 1. Specifically, the main guide section 16 constitutes a bottom wall of the distribution flow path 43, the first sub-guide section 21 constitutes a side wall of the distribution flow path 43, and the cover 1b constitutes a top wall of the distribution flow path 43. Since there is no member at the side edge 16a side of the main guide section 16 as described above, a long and narrow shaped slit-like space being elongated along the longitudinal direction (Y direction) of the battery pack case 1 is formed between the upper surface of the main guide section 16 at the side edge 16a side and the lower surface 1g of the cover 1b. This slit-like space constitutes an air distribution port 43a to establish fluid communication between the distribution flow path 43 and the supply flow paths 9a to 9c for the respective battery accommodation sections 7a to 7c. A section area of the distribution flow path 43 gradually decreases with increasing distance from the intake port 30.

The guide 15 includes a second sub-guide section 22. In a planar view, the sub-guide section 22 has one end positioned near the intake port 30 and extends obliquely in a straight line to the side edge 16b of the main guide section 16. In a planar view, the other end of the sub-guide section 22 is positioned at an end of the partition wall 5a side of the supply flow path 9a of the battery accommodation section 7a nearest to the intake port 30.

The first sub-guide section 21 functions to prevent that air supplied from the intake port 30 to the distribution flow path 43 flows to the left as shown in FIGS. 5 to 6A and reaches the exhaust flow paths 10a to 10c through the area above the upper portions of the battery modules 2 of the battery accommodation sections 7a to 7c. In other words, the first sub-guide section 21 functions to assure that air supplied from the intake port 30 to the distribution flow path 43 flows out from the air distribution port 43a. Contrarily, the second guide section 22 functions to forcibly guide a part of air supplied from the intake port 30 so as to flow to the supply flow path 9a of the battery accommodation section 7a via the distribution flow path 43.

At least a part of the guide member 15, specifically, a part of the guide member 15 opposed to the opening of the intake port 30 is provided as an impermeable part 23 made of a gas-impermeable material (for example, a metallic material such as iron). Accordingly, even if a gas (possibly at a high temperature and/or under a high pressure) were accidentally leaked out of the battery cell 25, it is possible to reliably prevent outflow of the gas from the intake port 30.

Contrarily, the first and second sub-guide sections 21 and 22 are made of an elastic material (for example, a sponge or a foamed seal material). Therefore, when the battery pack cover 4 is attached to the battery pack case 1, the upper ends of the guide sections 21 and 22 are urged to the lower surface 1g of the cover 1b, thereby the guide sections 21 and 22 separate the distribution flow path 43 with respect to other areas of the interior space within the battery pack case 1. Since the guide sections 21 and 22 elastically deform, too high part accuracy is not required and the attached cover 1b is in a stable state due to a pressure contact force. In other word, the first and second sub-guide sections 21 and 22 made of an elastic material enables formation of the desired distribution flow path 43 without the need to raise so much the accuracy of processing the sub-guide sections 21 and 22, thereby reducing const.

Next, a flow path of cooling air will be described. Air flows from the intake port 30 into the distribution flow path 43. The air flown into the air flow path 43 is split by the second sub-guide section 23 of the guide 15. The split air partly flows from an area of the air distribution port 43a on the intake port 30 side into the supply flow path 9a of the battery accommodation section 7a. The air flown into the supply flow path 9a does not flow toward the supply flow path 9b of the battery accommodation section 7b adjacent at the downstream side due to the presence of the partition wall 5a, but flows toward the exhaust flow path 10a through the clearances 11 between the battery cells 25 of the battery modules 2 stored in the battery accommodation section 7a. Accordingly, the battery cells 25 of the three battery modules 2 accommodated in the battery accommodation section 7a are cooled. The air flown into the exhaust flow path 10a is exhausted to outside of the battery pack case 1 from the exhaust port 31 through the exhaust flow paths 10b and 10c.

The rest of the air split by the second guide section 22 flows through the distribution flow path 43 in a direction distant from the intake port 3C as guided by the first sub-guide section 21, and flows from the air distribution port 43a into the supply flow paths 9b and 9c of the battery accommodation sections 7b and 7c. The air flown into the supply flow path 9b does not flow into the supply flow path 9c of the battery accommodation section 7c adjacent at the downstream side due to the presence of the partition wall 5b, but flows toward the exhaust flow path 10b through the clearances 11 between the battery cells 25 of the battery modules 2 accommodated in the battery accommodation section 7b. The air flown into the exhaust flow path 10b is exhausted to outside of the battery pack case 1 from the exhaust port 31 through the exhaust flow path 10c. The air flown into the supply flow path 9c also flows into the exhaust flow path 10c through the clearances 11 between the battery cells 25 of the battery modules 2 accommodated in the battery accommodation section 7c, and then is exhausted from the exhaust port 31. When the air flows from the supply flow paths 9b and 9c into the exhaust paths 10b and 10c through the clearances 11 between the battery cells 25 of the electric modules 2 accommodated in the battery accommodation sections 7b and 7c, the batteries 25 are cooled by the air.

Supplied to each of the battery accommodation sections 7a and 7b is not the air already passed through the clearances 11 between the battery cells 25 accommodated in other battery accommodation section 7a or 7b, but the air taken from the air intake port 30 through the distribution flow path 43 and the supply flow paths 9a to 9c. The flow of the air unifies the efficiency of cooling the battery cells 25 among the battery accommodation sections 7a to 7c, thereby improving the efficiency of cooling the battery cells 25 in the entire battery pack.

The section area of the distribution flow path 43 gradually decreases with increasing distance from the intake port 30. With regard to a pressure difference, the distribution flow path demonstrates a tendency to allow air flow more easily with increasing distance from the intake port 30 (with flowing downstream side). By the gradually decreased section area of the distribution flow path 43 with increasing distance from the intake port 30 (with flowing downstream side), the distribution flow path 43 demonstrates a tendency where the air flows less easily with increasing distance from the intake port 30. The tendency of the air flowability due to a pressure difference is canceled by the tendency of the air flowability due to the change in section area of the distribution flow path 43, whereby a unified amount of air flows from the distribution flow path 43 into the supply flow path 9a to 9c of each of the battery accommodation sections 7a to 7c. As a result, the efficiency of cooling the battery cells 25 among the battery accommodation sections 7a to 7c can further be unified, thereby further improving the efficiency of cooling the battery cells 25 in the entire battery pack 4.

In addition to the distribution flow path 43 configured to have a section area smaller with increasing proximity to the downstream side as described above, the second sub-guide section 22 is provided to split the flowing air immediately behind the intake port 30 so as to send the split air into the supply flow path 9a of the battery accommodation section 7a positioned nearest to the exhaust port 30 (of the three supply flow paths, air is least prone to flow into the supply flow path 9b with regard to a pressure difference). Accordingly, a further unified amount of air is supplied from the distribution flow path 43 to the three supply flow paths 9a to 9c. As a result, the efficiency of cooling the battery cells 25 is further unified between the battery accommodation sections 7a to 7c, thereby further improving the efficiency of cooling the battery cells 25 in the entire battery pack 4.

Since the distribution flow path 43 is defined by the guide 15 disposed between the cover 1b of the battery pack case 1 and the battery modules 2 and the lower surface 1g of the cover 1b, it is possible to obtain a desired flow of air without the need for upsizing of the battery pack 4. In addition, since the distribution flow path 43 is defined using the lower surface 1g of the cover 1b, it is possible to suppress increase in parts count and parts-related costs.

Due to distribution flow path 43 defined by the guide 15 disposed between the cover 1b of the battery pack case 1 and the battery modules 2 and the lower surface 1g of the cover 1b, a desired flow of air can be obtained without the need for upsizing of the battery pack 4. The distribution flow path 43 defined using the lower surface 1g of the cover 1b can suppress increase in a parts count and parts-related cost. Further, since the distribution flow path 43 is disposed between the battery modules 2 and the cover 1b, it is possible to obtain a desired flow of air without influence of layout of the battery modules 2 and the junction box 3 within the battery pack case 1.

The present invention is not limited to the foregoing arrangement of the embodiment, but may be modified in various manners.

A guide similar to the guide in the embodiment may be disposed on the inner surface of the side wall 1c of the case main body 1a of the battery pack case 1, so that a distribution path is formed by the guide and the inner surface of the side wall 1c. In this case, the intake port 30 is provided on the side wall 1c of the case main body 1a.

The number of the battery accommodation sections provided in the battery pack case 1 may be two or four or more.

The guide 15 may include two or more second sub-guide sections for guiding air to the supply flow path of a specific battery accommodation section.

The battery pack case 1 may be divided into the battery accommodation sections and the JB accommodation section by expansion parts provided on the inner surfaces of the side walls 1c and 1d of the case 1, not by the partition walls 5a to 5c as in the embodiment. In addition, the partition walls 5a to 5c as in the embodiment may not necessarily be provided. If no partition walls are provided, the areas of the battery pack case in which the individual battery modules are disposed, function as battery accommodation sections in the present invention.

The distribution flow path 43 may be provided by the guide 15 disposed at the center of the battery pack case 1 in the width direction (X direction) in a planar view.

Outside air at an ambient temperature may be taken from the intake port 30 into the distribution flow path.

The individual battery modules stored in the battery pack race 1 and the individual battery cells in the battery modules may not be the same in structure.

The battery pack according to the present invention may use lithium ion batteries or other various batteries such as lead storage batteries.

The present invention has been described above in detail with reference to the accompanying drawings. However, various changes and modifications can be made by a person skilled in the art. Thus, such changes and modifications shall be interpreted as being contained in the present invention as long as they do not depart from the spirit and the scope of the present invention.

What is claimed is:

1. A battery pack, comprising:
    a case comprising an intake port for introducing air into an interior space thereof and an exhaust port for exhausting air from the interior space;
    a plurality of battery accommodation sections arranged along a first direction within the interior space of the case and respectively accommodating a plurality of battery cells with clearances therebetween;
    a plurality of supply flow paths provided at one end of a second direction of the battery accommodation sections, the second direction intersecting with the first direction;
    an exhaust flow path provided at another end of the second direction of the battery accommodation sections and communicated with the exhaust port;
    a guide disposed on an inner surface of the case and elongated along the first direction; and
    a distribution flow path defined by the guide and the inner surface of the case, elongated along the first direction, and communicated with the intake port and the supply flow paths,
    wherein the guide comprises:
        a main guide section positioned with a space to the inner surface of the case and elongated along the first direction; and
        a sub-guide section extending from one side portion of the main guide section to the inner surface of the case.

2. The battery pack according to claim 1, wherein the guide is provided such that a section area of the distribution flow path decreases with increasing distance from the intake port.

3. The battery pack according to claim 1, wherein at least a portion opposed to the intake port of the main guide section comprises a gas-impermeable material.

4. The battery pack according to claim 1, wherein the case comprises a bottom wall, and
    wherein the bottom wall of the case defines the supply flow paths.

5. The battery pack according to claim 1, wherein the case comprises a bottom wall, and
    wherein the bottom wall defines the exhaust flow path.

6. The battery pack according to claim 1, wherein the exhaust flow path is elongated along the first direction.

7. The battery pack according to claim 1, wherein the case comprises a bottom wall, and
    wherein the first direction extends substantially parallel to the bottom wall of the case.

8. The battery pack according to claim 7, wherein the second direction extends substantially parallel to the bottom wall of the case.

9. The battery pack according to claim 8, wherein at least one of the supply flow paths is elongated along the first direction.

10. The battery pack according to claim 8, wherein each of the supply flow paths is elongated along the first direction.

11. The battery pack according to claim 10, wherein the bottom wall of the case defines the supply flow paths and the exhaust flow path, the exhaust flow path being elongated along the first direction.

12. The battery pack according to claim 1, wherein an air distribution port is defined between another side portion of the main guide section and the inner surface of the case such that the air distribution port is elongated along the first direction.

13. A battery pack, comprising:
    a case comprising an intake port for introducing air into an interior space thereof and an exhaust port for exhausting air from the interior space;
    a plurality of battery accommodation sections arranged along a first direction within the interior space of the case and respectively accommodating a plurality of battery cells with clearances therebetween;
    a plurality of supply flow paths provided at one end of a second direction of the battery accommodation sections, the second direction intersecting with the first direction;
    an exhaust flow path provided at another end of the second direction of the battery accommodation sections and communicated with the exhaust port;
    a guide disposed on an inner surface of the case and elongated along the first direction; and
    a distribution flow path defined by the guide and the inner surface of the case, elongated along the first direction, and communicated with the intake port and the supply flow paths,
    wherein the guide includes:
        a main guide section positioned with a space to the inner surface of the case and elongated along the first direction; and
        a first sub-guide section extending from one side portion of the main guide section to the inner surface of the case, and
    wherein an air distribution port is defined between another side portion of the main guide section and the inner surface of the case such that the air distribution port is elongated along the first direction and communicates the distribution flow path with the supply flow paths.

14. The battery pack according to claim 13, wherein the guide further includes a second sub-guide section guiding the air introduced from the intake port to one of the supply flow paths of a specific one of the battery accommodation sections.

15. The battery pack according to claim 14, wherein the case includes a case main body with an opening at an upper portion thereof and a cover attached to the case main body so as to close the opening,
    wherein the main guide section is positioned with a space to an inner surface of the cover and together with the inner surface of the cover defines the distribution flow path positioned above the battery cells, and
    wherein the first and second sub-guide sections extend from the main guide section toward the inner surface of the cover.

16. The battery pack according to claim 15, wherein the first and second guide sections comprise an elastic material and are urged to the inner surface of the cover attached to the case main body.

* * * * *